United States Patent [19]

LeBeau

[11] Patent Number: 5,137,362

[45] Date of Patent: Aug. 11, 1992

[54] AUTOMATIC PACKAGE INSPECTION METHOD

[75] Inventor: Christopher J. LeBeau, Tempe, Ariz.

[73] Assignee: Motorola, Inc., Schaumburg, Ill.

[21] Appl. No.: 498,776

[22] Filed: Mar. 26, 1990

[51] Int. Cl.$^5$ .................... G01B 11/00; H04N 7/18; G06K 9/00

[52] U.S. Cl. ........................................ 356/394; 382/8; 382/22; 356/237; 358/106; 358/107

[58] Field of Search ............... 356/237, 239, 128, 376, 356/388, 390, 394, 398, 391, 392, 393, 397, 2; 250/561, 563; 382/8, 9, 22, 34, 23, 54, 55; 358/101, 106, 107

[56] References Cited

U.S. PATENT DOCUMENTS

| | | | |
|---|---|---|---|
| 2,629,936 | 3/1953 | Cronstedt | 33/174 |
| 4,334,241 | 6/1982 | Kashioka et al. | 382/8 |
| 4,494,139 | 1/1985 | Shima et al. | 358/107 |
| 4,630,225 | 12/1986 | Hisano | 356/394 |
| 4,737,845 | 4/1988 | Susuki et al. | 358/101 |
| 4,845,764 | 7/1989 | Ueda et al. | 382/8 |
| 4,847,911 | 7/1989 | Morimoto et al. | 358/101 |
| 4,878,125 | 10/1989 | Katayama et al. | 358/443 |
| 4,969,199 | 11/1990 | Nara | 382/8 |
| 4,981,372 | 1/1991 | Morimoto et al. | 356/375 |
| 5,012,524 | 4/1991 | Le Beau | 382/22 |

OTHER PUBLICATIONS

"Tutorial on Advances in Morphological Image Processing and Analysis" Ophide Engineering, Jul. 1987; vol. 26; No. 7, pp. 623-632, Maragos.

"Edge Detection by Compass Gradient Masks", Computer Graphics and Image Processing, Güner S. Robinson, 1977, pp. 492-501.

Digial Image Processing, Ch 16; K. Castleman, Prentice-Hall, Inc (1979) pp. 321-346.

Primary Examiner—Richard A. Rosenberger
Assistant Examiner—Hoa Pham
Attorney, Agent, or Firm—Joe E. Barbee; Stuart T. Langley

[57] ABSTRACT

A real time automatic visual semiconductor package inspection method is provided wherein a direction edge enhancement is performed on an image of the package. The direction edge enhanced image is dilated and correlated to a stored direction edge shape to identify all shapes of interest in a package under inspection. Also, anomalous shapes and uncorrelated direction edge shapes are identified and dilated. The dilated direction edge shape is analyzed using relatively simple mathematic techniques such as counting the number of shapes of a particular type, transforming shapes of interest to identify points of interest, and measuring relative position between the points of interest to determine acceptability of the semiconductor package. Also, size and location of anomalous shapes are calculated to determine acceptability of the package.

13 Claims, 2 Drawing Sheets

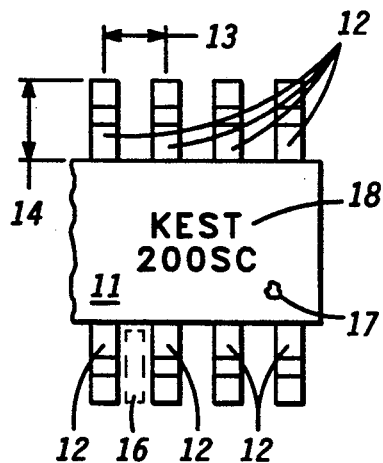
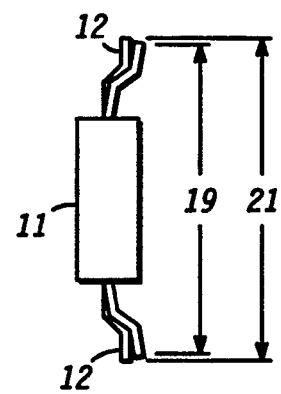
FIG. 1  FIG. 2
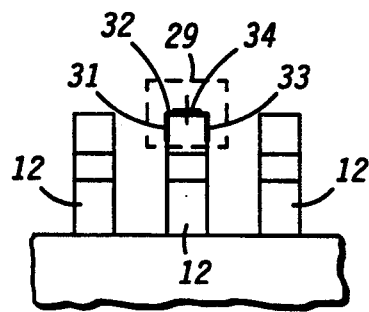
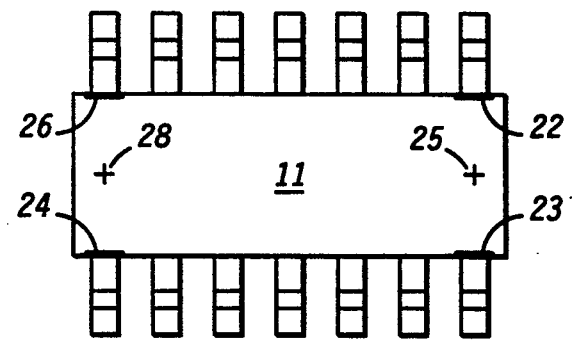
FIG. 3  FIG. 4
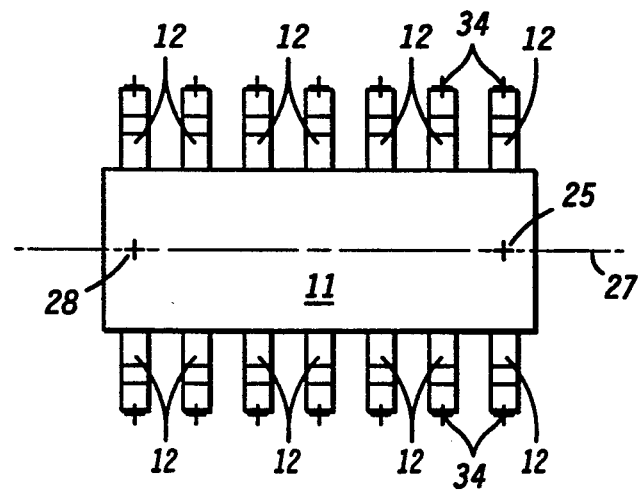
FIG. 5

AUTOMATIC PACKAGE INSPECTION METHOD

BACKGROUND OF THE INVENTION

This invention relates, in general, to methods automatically inspecting items, and more particularly, to a method for automatically inspecting a semiconductor package.

During the assembly of components in a manufacturing cycle it becomes necessary to verify the location, alignment, and condition of articles being used in the cycle. This is particularly true in an automated or semi-automated assembly cycle. In the manufacture of semiconductor devices it is particularly important to inspect the semiconductor package before shipping to ensure that the package is free of voids, foreign material, and that leads which extend from the package are in proper alignment. Recently, solid state television cameras have been used to visually monitor semiconductor packages. The data from the camera can then be processed in a digital manner to determine the coordinate location of the semiconductor package and leads. However, the manner in which the data is processed determines speed, accuracy, and robustness of the monitoring system.

Digital processing of a visual image involves reducing a large amount of image data to a minimum data set while retaining information about important characteristics of the package. Important characteristics are package dimensions and spacings which must meet predetermined specifications, as well as data which represents anomalous shapes caused by debris and manufacturing defects. Specified data includes such things as lead spacing, lead alignment, and package size. Anomalous data includes the location and size of voids, cracks, chips in the package or foreign matter such as excess ink on the package. To determine the acceptability of the semiconductor package under inspection the data set must be compared to some standard or specification. In the past, this standard has been determined by recording and processing a visual image of a number of packages which were known to be acceptable. These images could then be used as a standard to which the image of a package under inspection could be compared. One problem with this technique, however, is that images are very sensitive to background lighting, reflectivity, and magnification of the image under inspection. Since these conditions are quite variable in a production environment, image comparison or image correlation techniques are difficult to use in a production inspection operation and require a great deal of manual intervention.

Accordingly, it is an object of the present invention to provide an improved method of manipulating data to automatically inspect a semiconductor package.

Another object of the present invention is to provide a method to automatically inspect a semiconductor package and leads in a manner that is fast and accurate.

Yet another object of the present invention is provide a method to analyze visual data against a predetermined specification in a real time fashion.

A further object of the present invention is to use direction edge correlation techniques to identify key features of a semiconductor package.

Still another object of the present invention is to use morphological dilation techniques to increase the robustness of an image analysis system.

SUMMARY OF THE INVENTION

The above and other objects and advantages of the present invention are achieved by a visual package inspection method comprising obtaining an image of an article and performing a direction edge enhancement of the image. The direction edge image is dilated and correlated to a stored direction edge shape to identify all shapes of interest in a package under inspection. Also, anomalous shapes and uncorrelated direction edge shapes are identified and dilated. The dilated direction edge shape is analyzed using relatively simple mathematical techniques such as counting the number of shapes of a particular type, transforming shapes of interest to identify points of interest, and measuring relative position between the points of interest to determine acceptability of the semiconductor package. Measurements of the package are compared to predetermined specification values. Also, size and location of anomalous shapes are calculated to determine acceptability of the package.

BRIEF DESCRIPTION OF THE DRAWINGS

FIG. 1 illustrate a top view of a semiconductor package that can be automatically inspected by the present invention;

FIG. 2 illustrates a side view of the semiconductor package shown in FIG. 1;

FIG. 3 illustrates a magnified top view of the semiconductor package shown in FIG. 1 illustrating a lead inspection process;

FIG. 4 illustrates a top view of a semiconductor package in an initial stage of the inspection process in accordance with the present invention;

FIG. 5 illustrates a top view of a semiconductor package further along in the inspection process in accordance with the prevent invention.

DETAILED DESCRIPTION OF THE DRAWINGS

Figure 6:
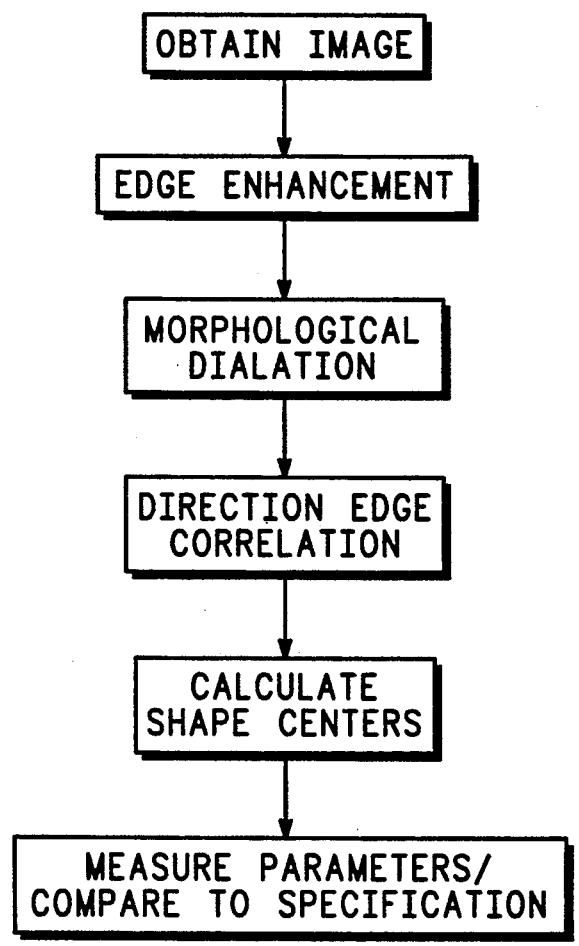
FIG. 6 illustrates in flow diagram form an inspection process.

FIG. 1 illustrates a top view of a semiconductor package which can be inspected using the method of the present invention. Semiconductor package body 11 is usually a uniform shape and color. A mark or label 18 may be formed on a top surface of semiconductor package 11. A plurality of leads 12 extend from semiconductor body 11. The actual number, spacing, shape, and size of leads 12 will vary from package type to package type. FIG. 1 illustrates a dual in-line surface mount package which is commonly used in the semiconductor industry.

Various critical dimensions which are often specified are also illustrated in FIG. 1. Lead finger spacing 13 is the spacing between any two adjacent leads 12. Lead finger height 14 is the distance which any lead 12 extends beyond package body 11. Anomaly 16 represents debris or foreign matter which may form between leads such as mold flash or excess metal. Anomaly 17 represents a void or debris which may be present on the top surface of package body 11. Acceptability of the semiconductor package is determined by measuring lead finger height 14, lead finger spacing 13, as well as measuring size and location of anomalies 16 and 17. Package label 18 is, of course, an acceptable mark on the top surface of package body 11 and must be distinguished from anomaly 17 when determining acceptability of the semiconductor package.

FIG. 2 illustrates a side view of the semiconductor package shown in FIG. 1. As in FIG. 1, leads 12 extend away from package body 11. Leads 12 will often be bent so they are not coplanar as illustrated in FIG. 2. Since coplanarity is often specified as a minimum coplanarity 19 or maximum coplanarity 21, this feature must be measured. Non-coplanarity can be seen as a vertical displacement of the tips of leads 12 thus, measurements 19 and 21 can be made by analyzing a top view of the semiconductor package as shown in FIG. 1.

To measure the specified quantities shown in FIGS. 1 and 2 in an automatic inspection method it is necessary to first obtain an image of the semiconductor package with a television camera. This image is then analyzed to determine points of interest such as points which identify package corners and lead finger locations. The relative position of these points of interest can then be measured.

As an inspection run begins, the operator places the inspection system in what is referred to as a learn mode. In this mode a representative semiconductor package is selected and analyzed. For reasons which will become apparent, this semiconductor package need not be a perfect example, or even a particularly good example of the semiconductor package. The sample which is selected needs merely to share some common features such as lead count, lead size, and package shape with the packages which are under inspection. In learn mode an image is obtained of the sample package usually using a solid state television camera. A direction edge enhancement is then performed on the image. Direction edge enhancement is a well known image processing technique which identifies discontinuities in the image which correspond to edge features. In addition to finding the edge features, each edge feature is associated with a direction, i.e. North, South, East, or West. It has been found that these direction edge features require a minimal amount of data to accurately and repeatedly identify features of the semiconductor package.

FIG. 3 illustrates a lead portion of a semiconductor package having several direction edge features superimposed on the image. In learn mode, an operator would identify a window 29 in which direction edge features of interest can be found. Any number of windows 29 may be used on the semiconductor package to find key features such as a lead, a package corner, or a label. Once window 29 has been placed around lead 12 a direction edge enhancement is performed of the image in window 29. Direction edge enhancement produces West edge 31, North edge 32, and East edge 33 of lead 12. Edges 31-33 combine to make a direction edge shape which can be used to identify any lead 12. Thus, as long as the all leads 12 which are to be inspected are similar in size, shape, and orientation to lead 12 in window 29, only one lead 12 need be analyzed to identify a lead direction edge shape. The lead direction edge shape is then stored to be used during the inspection run. The direction edge shape may be stored by building or storing a list of point locations on the direction edge shape in storing the list of point locations, as is well known in the art. As will become apparent, other aspects of the present invention compensate for rotation, magnification, and similar errors in the image.

It may be desirable to filter the image before performing the direction edge enhancement. A variety of image filtering techniques are known; the particular method chosen will depend on package features and imaging equipment used as well as the desired performance of the package inspection system. The choice of which filter techniques to use, or if a filter technique is needed, is well known to those of skill in the art.

A correlation shape center 34 can be calculated for the lead direction edge shape. The correlation shape center calculation will vary depending on the actual shape which is being analyzed. For example, for the lead direction edge shape shown in FIG. 3, it is desirable to calculate a point on North edge 32 which is half way between West edge 31 and East edge 33. It is not necessary in learn mode to store correlation shape center 34 of the sample lead 12, but correlation shape center 34 will be used during run mode to analyze a package under inspection.

FIG. 4 illustrates a semiconductor package having other direction edges superimposed on the image. North edge 22 and South edge 23 are identified in the right portion of the image and North edge 26 and South edge 24 are identified in the left image of the package. The process for identifying these package direction edges is similar to that described in reference to FIG. 3. If package body 11 is symmetrical it may be possible to identify only one package edge, for example North edge 22, in the learn mode and transpose this information to identify remaining edges 23, 24, and 26. Correlation shape centers 28 and 25 are calculated by finding a midpoint between North and South edges in both the right and left fields of the image. As noted hereinbefore, it is not necessary to calculate correlation shape centers in the learn mode, but it is necessary to store direction edge shapes 22, 23, 24, and 26 for use during run mode inspection.

Once all direction edge shapes of interest have been identified and stored during a learn mode the inspection system can be placed in run, or inspection mode. In inspection mode a plurality of packages which are similar to the sample package are placed sequentially in the field of vision of the television camera. An image is obtained of each package and a direction edge enhancement is performed. Inspection mode differs from learn mode in that an operator is not required to identify windows, such as window 29 shown in FIG. 3, during inspection mode. Thus, direction edge shapes of the entire semiconductor package and leads are formed. It should be noted that a variety of edge enhancement algorithms are known, any of which may be used for the direction edge analysis of the present invention. Commonly, because lead material and package body material vary significantly in reflectivity, a combination of direction edge algorithms is used to identify all of the direction edges in the image.

FIG. 5 illustrates an image of a semiconductor package partially through inspection and having inspection data superimposed on the image. Once a direction edge image of the semiconductor package is obtained, key features of the direction edge image must be identified. This identification is achieved by correlating the stored direction edge images from the sample to the direction edge image of the package under inspection. For example, a direction edge shape comprising edges 31-33 shown in FIG. 3 is correlated to the direction edge image of the package under inspection to identify each lead 12 on the package under inspection. Likewise, edge shapes 22, 23, 24, and 26, shown in FIG. 4, are correlated to the direction edge image of the package under inspection to identify edges of package body 11. Once these locations have been identified, correlation shape centers 25, 28, and 34 are calculated as described hereinbefore and illustrated in FIG. 5. For measurement purposes it is desirable to calculate a location of an x axis also called a package body axis 27 which is simply a line connecting correlation shape centers 25 and 28. Similarly, a y axis (not shown) can be calculated by finding a line lying equidistant from the location of left package edge shapes 26 and 24 and right package edge shapes 22 and 23.

Once correlation shape centers have been identified it is a relatively simple calculating task to measure lead height 14 and lead finger space 13 for each lead 12. It will be apparent to those of skill in the art that other geometrical calculations can be performed to measure other specified features of the semiconductor package. Lead coplanarity can be found by constructing a best fit line between all shape centers 34 on one side of the semiconductor package. A deviation between the best fit line and the actual location of each shape center 34 can then be calculated, a higher deviation being an indication of non-coplanarity.

Particular importance should be paid to making the calculations robust so that they account for package rotation and magnification errors. Lead finger height 14, for example, can be measured by calculating the vertical distance between package body axis 27 and each lead finger shape center 34. Lead finger spacing 13 can be found by constructing a line (not shown) connecting each shape center 34 and body axis 25, and calculating the horizontal distance between each of these constructed lines. This calculation compensates for image rotation, whereas simple measuring the horizontal displacement between each lead finger shape center 34 would not compensate for image rotation.

One problem encountered in image analysis is compensating for acceptable variation in an image under inspection. Such qualities as overall size and rotation of the image can vary by 10%-20% without failing reject criteria. These acceptable variations can confuse an image analysis system, however, resulting in false detection and rejection of parts. Accuracy and repeatability of direction edge shape correlation can be greatly improved by mathematically transforming the direction edge image of the package under inspection before performing direction edge correlation.

One useful mathematical transformation is commonly referred to as morphological dilation and comprises growing the obtained direction edge image using a set of predetermined conditions. For example, a simple morphological dilation involves dilating all edges at an equal rate so that a direction edge image which was originally two pixels wide by ten pixels long would become four pixels wide by twelve pixels long. Morphological dilation thus swells the direction edge image thereby increasing the chances of correlating to a stored direction edge shape, while maintaining the relationship between direction edges so that data integrity is not compromised. Morphological dilation can be used to compensate for image rotation and magnification errors which can occur as the semiconductor package is indexed under the television camera. Morphological dilation also compensates for significant image variation greatly improves robustness and repeatability of the inspection system at minimal impact on accuracy.

The method just described for determining acceptability of a semiconductor package is summarized in a flow diagram shown in FIG. 6. An image to be inspected must be obtained and then a direction edge enhancement is performed. The direction edge enhanced image is morphologically dilated. Direction edge shapes which have been previously stored are then correlated to the dilated, direction edge enhanced image of the package under inspection. Direction edge correlation results in identification of features in the image under inspection which match the stored direction edge shapes. Each of these matching features is identified and shape centers are calculated for each of the matching features.

Acceptability of the package under inspection is determined by comparing the measured values to a specification for the package. The original sample which was used during learn mode serves only to identify shapes of interest in the package under inspection and is not a standard to which all other packages are compared. Instead, all packages are compared to an independent specification for the package. The ability to compare measurements to an independent specification greatly improves accuracy of the inspection system. It should be noted that the stored direction edge shapes do not have to be obtained in a "learn mode" as described hereinbefore. Edge shapes of interest can be calculated mathematically and stored if desired. It is useful, however, to redefine and restore direction edge shapes of interest before each inspection run to ensure integrity of the stored data and to allow for a wider variety of package types to be inspected.

Anomalous shapes are those direction edge shapes which do not correlate with stored direction edge shapes, and may represent unacceptable debris or package damage. Anomalous shapes are dilated and a size, shape, and centroid analysis is performed on the dilated direction edge shape. After analysis of the anomalous shapes, they are compared to predetermined specifications to determine acceptability.

By now it should be appreciated that there has been provided a real time automatic visual inspection process which can perform parameter measurement and comparison to a specification rather than comparison to an ideal image. Direction edge shapes of interest are identified in an image of a semiconductor package using direction edge correlation and morphological dilation processes. A combination of morphological dilation and direction edge enhancement provides a robust, repeatable, and accurate image identification technique. Once shapes of interest have been identified they can be analyzed by calculating shape centers and measuring relative position of the shape centers. Key parameters of the semiconductor package can thus be measured and compared to a specification to determine acceptability of the semiconductor package.

I claim:

1. A method for automatically inspecting a semiconductor package, wherein the semiconductor package has a number of edge features, the method comprising: obtaining an image of the package; performing a direction edge enhancement to determine a plurality of package direction edges, wherein the direction edge enhancement further comprises identifying edge features in the image and identifying a direction for each edge feature; building a list of point locations of the package direction edges; and comparing the point locations against a predetermined list of acceptable point locations.

2. The method of claim 1 further comprising morphological dilation of the package direction edges before building the list of point locations.

3. The method of claim 1 further comprising: locating leads which extend from the package by obtaining an image of the leads, determining a plurality of lead direction edges, building a list of point locations on the lead direction edges, and comparing the point locations of the leads to each other and to the point locations of the package direction edges to determine acceptable shape and alignment of the leads.

4. The method of claim 1 further comprising: identifying anomalous shapes having direction edge points which are not included on the predetermined list; calculating area and location of the anomalous shapes; and determining acceptability of the semiconductor package from the area and location of the anomalous shapes.

5. A method for automatically inspecting a semiconductor package, wherein the semiconductor package has a plurality of edge features, the method comprising: obtaining an image of a sample package and leads which extend from the sample package; determining a direction edge shape for the sample package, wherein the step of determining the direction edge shape for the sample package further comprises identifying edge features in the image of the sample package and identifying a direction for each edge feature; determining a direction edge shape for leads which extend from the sample package, wherein the step of determining the direction edge shape for the leads of the sample package further comprises identifying edge features in the image of the leads which extend from the sample package and identifying a direction for each edge feature; storing the direction edge shape for the sample package and leads; obtaining an image of a package under inspection; determining a direction edge shape for the package under inspection, wherein the step of determining the direction edge shape for the package under inspection further comprises identifying edge features in the image of the package under inspection and identifying a direction for each edge feature; comparing the direction edge shape of the package under inspection to the stored direction edge shape of the sample package; determining a direction edge shape of the leads of the package under inspection, wherein the step of determining the direction edge shape for the leads of the package under inspection further comprises identifying edge features in the image of the leads which extend from the package under inspection and identifying a direction for each edge feature; and comparing the direction edge shape of the leads of the package under inspection to the direction edge shape of the sample leads and to the direction edge shape of the package under inspection.

6. The method of claim 5 further comprising determining a direction edge point list for any direction edges of the package under inspection which do not match the direction edge shape of the sample package and performing an area and centroid analysis of the direction edge point list.

7. The method of claim 5 wherein after determining the direction edge shape of the package under inspection the shape of the package under inspection is mathematically transformed to compensate for rotation, illumination, and magnification errors.

8. The method of claim 5 wherein the steps of obtaining an image, determining a direction edge shape and comparing the direction edge shape for the package under inspection and for the leads of the package under inspection are performed repeatedly for a plurality of packages.

9. A method of inspecting a semiconductor package, wherein the semiconductor package has a number of edge features, the method comprising: obtaining an image of the package; performing direction edge enhancement to form a direction edge shape, wherein the step of performing a direction edge enhancement further comprises the steps of identifying edge features of the image of the package and identifying a direction for each edge feature; dilating the direction edge shape; and testing the dilated direction edge shape for correlation to a predetermined shape which has been previously stored.

10. The method of claim 9 further comprising identifying dilated direction edge shapes which correspond to locations of upper right, upper left, lower right, and lower left package edge shapes.

11. The method of claim 10 further comprising identifying dilated direction edge shapes which correspond to leads which extend from the package.

12. The method of claim 11 further comprising calculating the location of an x-axis which lies equidistant from the location of the upper and lower package edge shapes; calculating the location of a y-axis which lies equidistant from the location of the left and right package edge shapes; calculating a lead shape center location for each of the direction edge shapes which correspond to leads; calculating a difference between each of the lead shape center locations and the x-axis; calculating a difference between each of the lead shape center locations and the y-axis; calculating a location of a best-fit line using the lead shape center locations; subtracting the lead shape center locations from the best fit line to determine a coplanarity error for each lead; and comparing each of the differences and the coplanarity errors to predetermined specification limits to determine acceptability of the semiconductor package.

13. The method of claim 9 further comprising identifying an anomalous shape which cannot be correlated to the stored predetermined direction edge shape and dilating the anomalous shape.

* * * * *